Nov. 7, 1967 R. E. RIEBS 3,351,814

ELECTRONIC TIME DELAY DEVICES

Original Filed Oct. 5, 1961 4 Sheets-Sheet 1

INVENTOR.
RICHARD E. RIEBS
BY Fred Wiviott
ATTORNEY

INVENTOR
RICHARD E. RIEBS
BY Fred Wiviott
ATTORNEY

Nov. 7, 1967 R. E. RIEBS 3,351,814

ELECTRONIC TIME DELAY DEVICES

Original Filed Oct. 5, 1961

4 Sheets-Sheet 3

INVENTOR.
Richard E. Riebs
BY Fred Wiviott
Attorney

Nov. 7, 1967 R. E. RIEBS 3,351,814

ELECTRONIC TIME DELAY DEVICES

Original Filed Oct. 5, 1961 4 Sheets-Sheet 4

INVENTOR.
Richard E. Riebs
BY Fred Wiviott
Attorney

United States Patent Office 3,351,814
Patented Nov. 7, 1967

3,351,814
ELECTRONIC TIME DELAY DEVICES

Richard E. Riebs, Hales Corners, Wis., assignor to McGraw-Edison Company, Milwaukee, Wis., a corporation of Delaware

Original application Oct. 5, 1961, Ser. No. 143,094, now Patent No. 3,167,686, dated Jan. 26, 1965. Divided and this application Mar. 4, 1964, Ser. No. 349,347
The portion of the term of the patent subsequent to Jan. 26, 1982, has been disclaimed
13 Claims. (Cl. 317—36)

This application is a division of copending application Ser. No. 143,094, filed Oct. 5, 1961, now Patent No. 3,167,686, which in turn is a continuation-in-part of application Ser. No. 711,960, filed Jan. 29, 1958, which is now abandoned.

This invention relates to electronic time delay devices and, more particularly, to electronic time delay devices that have particular, but not exclusive, application as time delay means for repeating circuit interrupters or reclosers.

Most protective devices utilized in electric power and distribution circuits have inverse time-current characteristics, that is, they will operate rapidly upon the occurrence of a high fault current and will operate relatively slower upon smaller fault currents.

It is common practice to utilize a variety of protective devices having time-current characteristics of different shapes and slopes in a single electrical system. For example, a distribution system may be provided with a repeating circuit interrupter or recloser connected in series with the main line and located adjacent the source of power and fuses disposed in feeder lines radiating from the main line. Because the majority of faults in such systems are temporary in nature, and will clear in a relatively short time, it is common to arrange for the execution of a series of rapid opening and reclosing operations by the repeating circuit interrupter, so that the period in which the system remains energized is shorter than the time necessary for the fuse elements to melt.

If the fault does not clear during this initial series of rapid operations, they are followed by a second series of operations in which the recloser contacts remain closed for a period of sufficient length to melt the fuse elements. This time delay, however, must not be of such duration that damage to the system itself will result. An optimum timing relationship for a wide range of fault current values can best be achieved by utilizing a repeating circuit interrupter or recloser having time current characteristics which closely parallel those of the other protective devices with which it is coordinated.

Prior art devices generally utilized in reclosers and repeating circuit interrupters are either hydraulic, mechanical or electromagnetic. The hydraulic time delay devices such as dashpots are not entirely satisfactory because temperature changes tend to change the viscosity of the hydraulic fluid and, as a result, the time delay characteristic of the device. Electromagnetic time delay devices such as induction relays, are also unsatisfactory because the induction disc cannot be rapidly reset after the disappearance of a fault, because of the inertia of the induction disc tends to result in coasting, and because the pull-in current of such devices is substantially greater than their dropout current and, as a result, the device cannot be reset after the disappearance of a fault unless there is a sufficient current drop. Another shortcoming of prior art time delay devices are their large number of moving parts which generally increase maintenance costs and inherently subject them to changes in their time-current characteristics due to wear. Also, because the speed of the mechanical components of these devices is, of course, dependent on the magnitude of the fault current, they are extremely inaccurate at very low values of fault current. A further disability of prior art time-delay devices is that in any given device the time-current characteristics are relatively inflexible. As a result of the latter, prior art devices designed for coordination with one type of secondary protective device cannot conveniently be adapted for use with another.

An object of the invention is to provide a new and improved time-delay device.

It is another object of the invention to provide an electronic timing device which is particularly, but not exclusively, adapted for use with repeating circuit interrupters.

A further object of the invention is to provide an electronic time-delay device wherein the slope and/or height of its time-current characteristic is easily and accurately adjustable.

Another object of the invention is to provide a time-delay device whose time-current characteristic is not affected by temperature or wear or the inertia of mechanical parts.

It is another object of the invention to provide a time-delay device which is relatively accurate at small fault-current values.

Another object of the invention is to provide a time-delay device wherein its time-current characteristic can be quickly and accurately adjusted for both high and low values of fault current.

These and other objects and advantages of this invention become more apparent from a detailed description thereof taken with the accompanying drawings in which.

Figure 1:
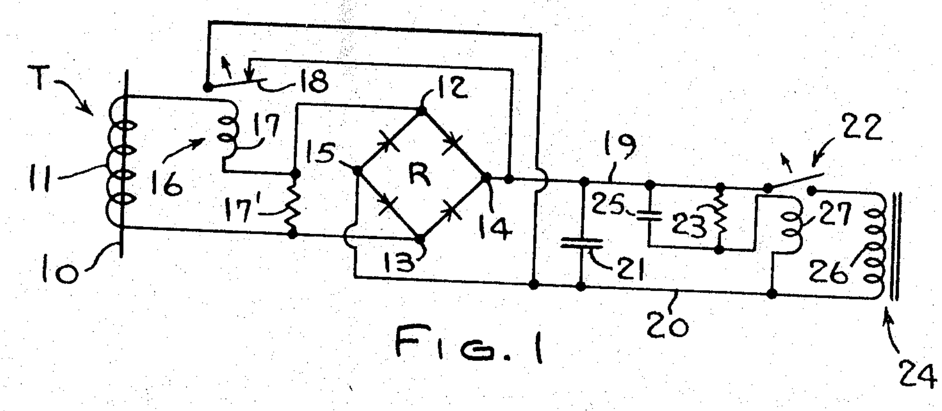
FIG. 1 is a circuit diagram illustrating one embodiment of the instant invention.
Figure 7:
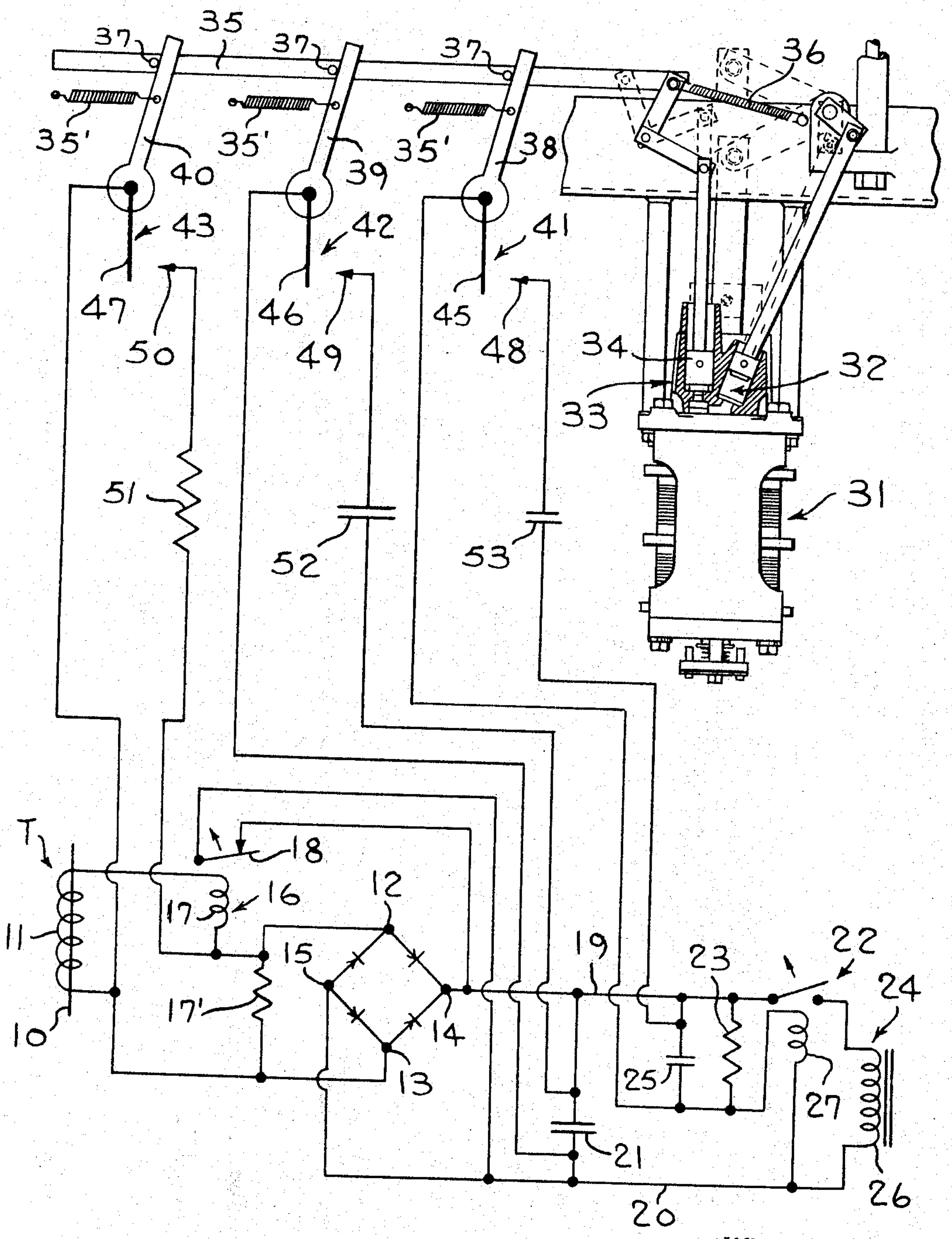
Figure 8:
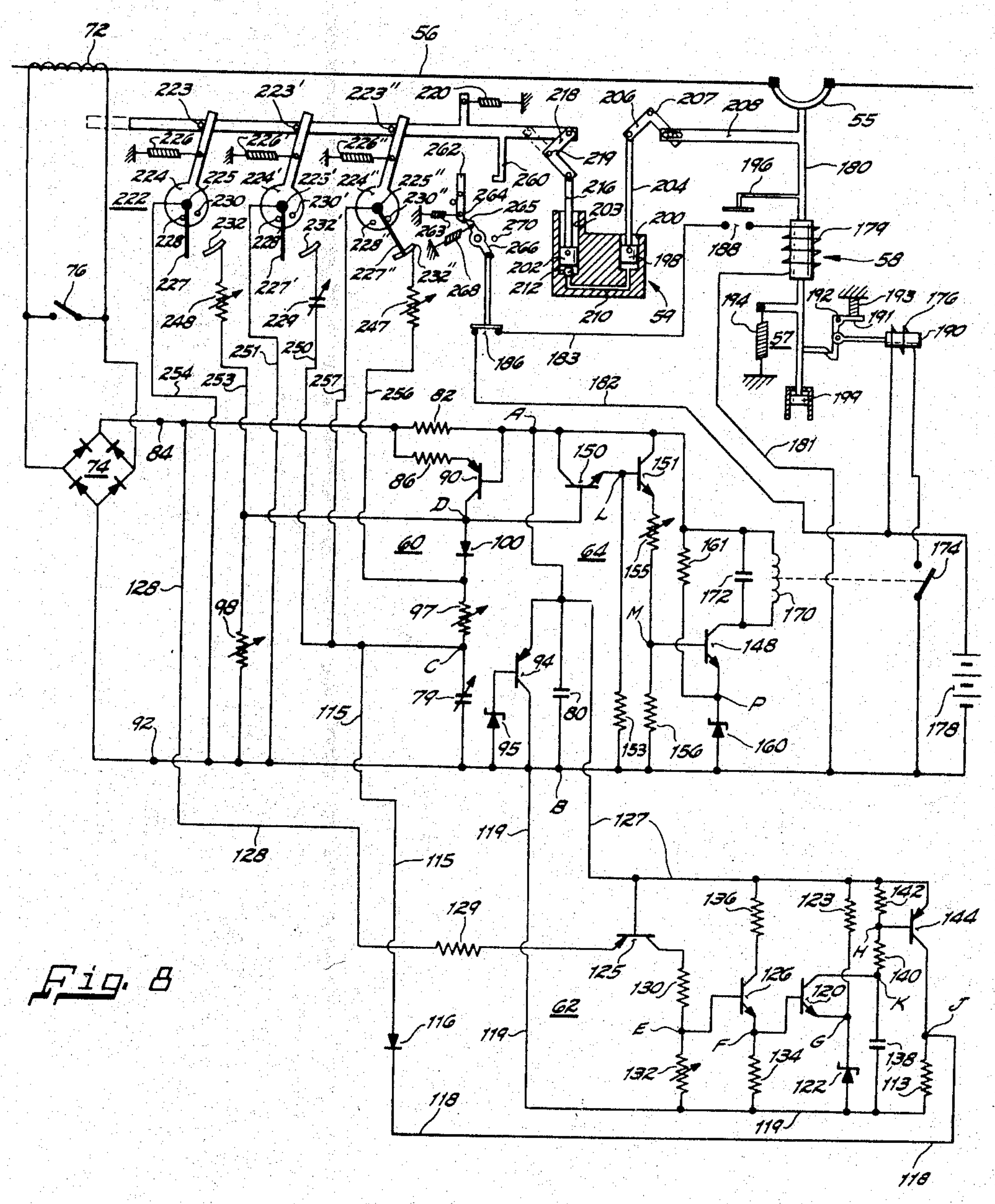

FIG. 7 schematically illustrates how a circuit interrupter embodying the embodiment of FIG. 1 may switch from one time-current characteristic to another;

FIG. 8 illustrates an alternative embodiment of the instant invention;

FIGS. 9–13 show how the time-current characteristics of the device illustrated in FIG. 8 may be modified.

Figure 2:
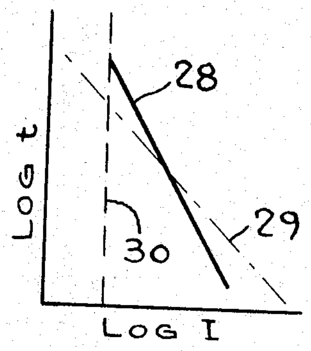
FIG. 2 shows the time-current characteristic of the device illustrated in FIG. 1.

Referring to the drawings in greater detail, particularly FIGS. 1 and 2, it will be seen that the device comprises a current transformer indicated generally by the reference character T operated from the power line 10 and provided with a secondary 11.

This current transformer has the terminals of the secondary 11 connected to the input terminals 12 and 13 of a bridge rectifier R. The output terminals of the rectifier R are numbered 14 and 15.

The circuit leading from the current transformer T to the bridge rectifier R includes the operating coil 17 of an input relay indicated generally by the reference character 16. This relay 16 is biased closed, its armature being indicated at 18 and the direction of bias being indicated by the arrow.

A resistor 17' is connected across the input terminals 12 and 13 of the rectifier, as shown in FIG. 1.

The direct current lines 19 and 20 are initially shorted by the relay 16 until the load in the power line 10 reaches a predetermined minimum overload value. At this time the relay opens and the short circuit across the lines 19 and 20 disappears.

A relatively large storage condenser or capacitor 21 is connected directly across the direct current output lines 19 and 20, as shown in FIG. 1.

A second relay or output relay, indicated by the reference character 22, is provided and its operating coil 27 is connected through a series resistor 23 to the output line 19 at one end, and its other end is connected to the output line 20. Normally, the circuit controlled by this output relay is open, as the relay is biased open as indicated by the arrow. It is to be noted that the resistor 23 is bridged by a relatively small condenser 25, that is to say, smaller than the condenser 21.

The time delay device is intended to cause energization of the coil 26 of a motor means 24 when the operating coil 27 of the relay 22 is sufficiently energized after the overload has existed a predetermined time. The coil 26 may be the trip coil for a circuit interrupter, either single phase or three phase such as the trip coil 166 shown in FIG. 32 of the patent to Van Ryan et al., No. 2,810,038, of Oct. 15, 1957, for circuit interrupter, assigned to the same assignee as the present invention. Further, the motor means 24 may operate any other device desired, but is primarily intended to trip a circuit interrupter whether three phase as shown in the above noted patent or single phase. In other words, the trip coil or motor means 24 is adapted to release a circuit interrupter biased towards open position and restrained by any suitable latch or restraining means such as shown in detail in the above noted patent.

Attention is desired to FIG. 2, which is shown as full logarithmic for the current I and the time T of the time-current characteristic curve 28 for the circuit shown in FIG. 1. The imaginary line, shown in dot-and-dash, indicated at 29 in FIG. 2, shows the normal manner in which the device shown in FIG. 1 would operate if it did not have certain features which will be discussed hereinafter. This line or curve 29, in other words, shows the slant at a lesser angle than the desired characteristic curve 28. The imaginary line 29 may be considered the characteristic curve of the time delay device shown in FIG. 1 if certain elements such as the relay 16, the resistors 17' and 23, and capacitor 25, had been omitted.

The vertical dotted line 30 of FIG. 2 shows the minimum overload current at which the time delay device commences to operate or, in other words, the minimum current value due to minimum overload in the power line 10 at which the timing starts.

The resistors 17' and 23, and 17'', described hereinafter, could be adjustable resistors.

The operation of the apparatus shown in FIG. 1 is as follows:

When an overload occurs in the power line 10 the current furnished by the secondary 11 of the transformer T is sufficient to open the input relay 18 and to thus furnish direct current to the output lines 19 and 20. When an overload occurs, the voltage impressed on the large storage condenser 21 rises progressively from zero to a value determined by the circuit components.

The resistor 17' is placed in the circuit of the coil 17 of the power or input relay 16 so as to reduce the current passing through the bridge type rectifier. If desired, it could be omitted, but certain desirable characteristics of the device would then be lost as will be described hereinafter. It is to be noted that the operating coil 27 of the relay 22 is connected in series with the resistor 23 and is bridged by a relatively small condenser 25. When the current through the operating coil 27 arrives at a predetermined value it will close the switch 22 and thus energize the trip coil 26 of the circuit interrupter or cause energization of any other motor means with which the electronic time-delay device may be associated. It is to be noted that before the relay 22 has closed its contacts the relatively small condenser 25 is being charged, for low magnitude overload currents, to a value proportional to the voltage of the condenser 21. For high magnitude overload currents, tripping of the relay 22 occurs with much lower voltage on the small condenser 25. Without this condenser 25 and series resistor 23 for the operating coil 27 of the output relay 22, certain desirable characteristics of the device would be lost as will be pointed out hereinbelow.

The setting of the relay 16 determines the point on the abscissa (log *I*) of the current curve of FIG. 2 at which the minimum value current is indicated at 30, and at which the input relay or power relay 16 will open and start the timing operation.

The circuit, 19, 20, or any other means of connecting the output terminals 14 and 15 of the rectifier R, to the output relay 22 is called the intermediate circuit for simplicity of description.

Figure 5:
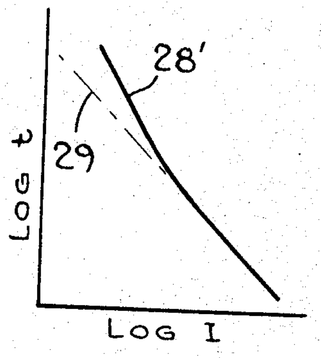
FIGS. 5 and 6 show time-current characteristics of the embodiment shown in FIG. 1.
Figure 6:
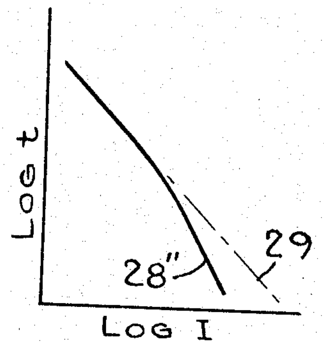

In describing the mode of operation or theory of this electronic time device, attention is directed to the curves shown in FIGS. 2, 5 and 6. If neither the resistor 17' nor the resistor 23 and its capacitor 25 were used, the current curve indicated at 29 would be the one followed for the time-current characteristic of the device. It is desirable to have a steeper slant for the time-current curve of the device than that indicated at 29, and means are provided for controlling the slant, both at the minimum current or upper end of the characteristic curve 28, as shown in FIG. 5, and at its lower or maximum overload end, as shown in FIG. 6.

These desirable features are obtained by means of the relative value or adjustment of the resistors 17' and 23 and the capacitor 25 bridging the resistor 23 as will appear immediately below.

In order to have a greater slant for the upper end or minimum current end of the characteristic curve 28', as shown in FIG. 5, the resistor 17' is positioned in the circuit as indicated in FIG. 1. It is also to be noted that the resistor 17' is in effect bridged directly across the input terminals 12 and 13 of the rectifier R. The coil 17 has a very small resistance which is negligible in comparison to the value of the resistance of the resistor 17'. The addition of this resistor 17' in shunt with the secondary of the current transformer provides an alternate path for the current from the secondary of the current transformer T. The current flowing through the resistor 17' at any particular instant is dependent only upon the voltage present on the capacitor 21, and is not affected by the magnitude of the secondary current from the current transformer T, as will be seen from the following explanation. At low transformer currents, a high percentage of the total current is flowing through the resistor 17' rather than into the storage condenser 21 through the rectifier R, and the tripping time is considerably longer. At high currents, the portion flowing through the resistor 17' is proportionally small, and the tripping time is little affected due to the change in current value.

Referring to the characteristic time-current curve of FIG. 6, attention is now directed to the resistor 23 and the parallel connected small capacitor 25. In this circuit the coil of the output relay 22, namely the coil 27, operates at a small fraction of the voltage on the condenser 21. The resistor 23 is added in series with the coil 27 of the output relay to provide closure of this relay at some value proportional to, but of lesser value than, the voltage on the condenser 21. The addition of the small capacitor 25 in shunt with the resistor 23 does not affect the value of the voltage on the large capacitor 21 which will cause the output relay 22 to close as long as the rate of rise of voltage on the storage capacitor 21 is slow. However, as the rate of rise of voltage on the capacitor 21 increases, the impedance of the parallel combination of resistor 23 and capacitor 25 decreases, and the output relay will close at progressively lower voltages on the storage capacitor 21. The end result is that the high current portion of the time-current characteristic shows a relatively faster operation of the relay 22 because of this decrease in the impedance of the parallel circuit consisting of the resistor 23 and the capacitor 25, while the low current portion is relatively unaffected by this arrangement. It is clear that the unit or circuit element consisting of the condenser 25 and resistor 23 in parallel constitutes, in effect, a non-linear circuit element. Obviously, other non-linear circuit elements such as an incandescent lamp or non-linear resistor, or semi-conductor device, could be used in place of the non-linear circuit element shown.

Combining both the above features of the resistor 17' across the input circuit of the bridge rectifier R and the combination of the resistor 23 and its bridging small capacitor 25 for the output relay 22 will cause the characteristic curve to move from that shown in imaginary lines, namely, dot-and-dash lines at 29 of FIG. 2, to that shown in full lines at 28 in FIG. 2, and will thus have the effect of considerably steepening the characteristic curve 28. The above explanations are better appreciated if it is considered that the operation of the output relay 22 is determined by both the voltage impressed on the large storage capacitor 21 and the rate of rise of this voltage, and that thus an alteration in the characteristic curve, namely, the change of slant or steepness of this curve, is determined at will by the arrangement and adjustment of the circuit component parts as described hereinabove.

It is obvious that the electronic overload time delay device is so constructed that the delay is not only inversely proportional to the magnitude of the overload, but this inverse relation is increased as the overload increases. In other words, there is a shorter time delay the heavier the overload, and this shortening of the time delay is over and above or beyond a direct inverse proportion to overloads, but automatically decreases in length of time out of proportion to the increase in the magnitude of the overload. In other words, the inverse relation is automatically increased.

Figure 3:
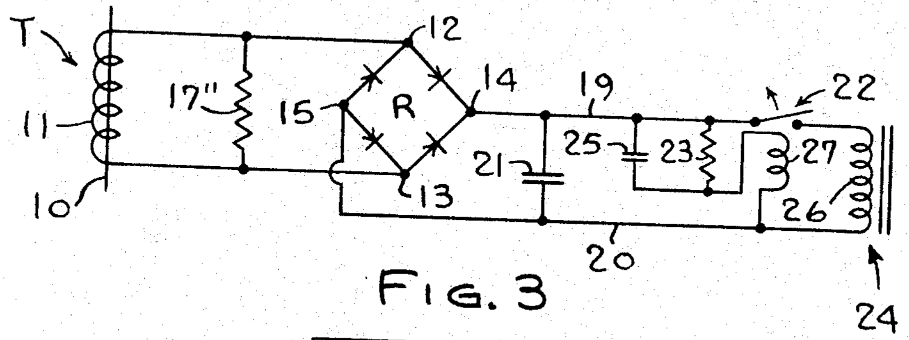
FIG. 3 is an alternate embodiment of the instant invention.

In the form of the invention shown in FIG. 3, the same operation as that hereinabove set forth takes place. However, it is to be noted that the time, or instant at which the electronic time delay device begins to operate, is not as sharply determined as in the circuit shown in FIG. 1, as there is no minimum current input relay corresponding to the relay 16 of FIG. 1. The operation of the output relay 22 is determined solely by the voltage impressed on the capacitor 21.

It will thus be seen that means have been provided for determining the slope of the characteristic curve 28 at both its upper and lower ends as shown in FIG. 2, and that the slant of the characteristic curve is adjusted to any desired value as described in detail hereinabove and as shown successively in FIGS. 5 and 6 finally ending in the desired characteristic curve shown in FIG. 2.

It will be seen that a novel type of time delay device has been provided for circuit interrupters, and that this time delay device is an electronic time delay device.

It is intended that if the electronic time delay device is to be used with a three phase circuit interrupter one of these time delay devices be provided for each of the three phases. It is also possible to use a single time delay device and the zero sequence circuit shown in FIG. 4 for three phase, but an even overload on all three lines will not cause tripping. The system shown in FIG. 4 is primarily intended for use as a sensitive ground fault device, or, in other words, where the overload appears due to a ground fault.

Figure 4:
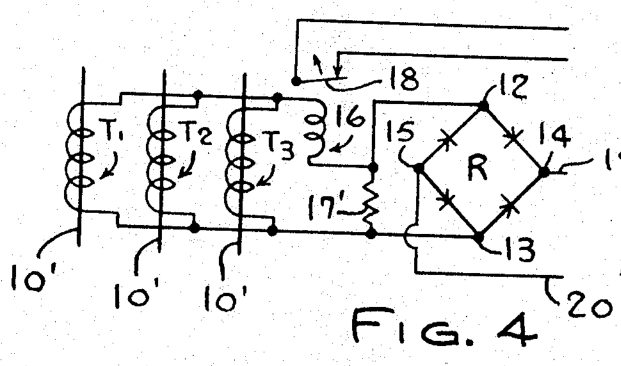
FIG. 4 illustrates how the device of FIG. 1 may be employed with a three-phase repeating circuit interrupter to detect phase unbalance.

In FIG. 4 the three current transformers T1, T2 and T3 have their terminals connected in parallel to the input terminals of the bridge rectifier R in exactly the same way as shown in FIG. 1. It is obvious that any material overload in any one or two of the power lines will cause the electronic time delay device to begin to function. If there is a complete balance in overload, the series or overload switches in the usual type of three phase circuit interruptor will operate, but, as stated, if all three of the current transformers were simultaneously and equally energized, the electronic time delay device will not function. It is, as stated, very much preferred to use three separate time delay devices of the form shown in FIG. 1 of the electronic time device than that shown in FIG. 4.

It is to be noted that other means could be used to furnish current to the bridge rectifier R provided the current furnished the bridge rectifier was proportional to the load current in the power line.

The electronic time delay device is so arranged in cooperating with a repeating circuit interrupter that any one or all of several different functions or characteristics of the time delay device can be changed after one or more operations of the circuit interrupter under normal conditions.

Referring to FIG. 7, it will be seen how the electronic timer can be applied to a repeating circuit interrupter and can be so arranged that it cooperates with the repeating circuit interrupter to increase the time delay or in certain cases decrease the time delay and also to control any of several functions of the time delay device after the repeating circuit interrupter has executed one or more operations under initial conditions.

Referring to FIG. 7, it will be seen that such figure shows a portion of a repeating circuit interrupter like that disclosed in the copending application, Anthony Van Ryan et al., Ser. No. 442,572, filed July 12, 1954, for Repeating Polyphase Circuit Interrupter, which application discloses such repeating circuit interrupter having a cumulative or counting mechanism.

The copending application shows this counting means for a three phase circuit interrupter, but this type of counting means could be used for a single phase as well as a three phase system.

In FIG. 7 the resetting electromagnet is illustrated generally at 31, and a small pumping means is illustrated at 32, and the cumulative cylinder of the hydraulic counting means at 33. For each operation of the circuit interrupter, the pump 32 executes one pumping operation and raises the piston 34 of the cumulative hydraulic device one step upwardly, this in turn shifts the counting bar or cumulative bar 35 one step to the left in accordance with the disclosure of the co-pending application hereinabove identified.

The cumulative bar or counting bar 35 is urged towards its initial position by means of a spring 36 and is provided with a plurality of pins 37 which operate the arms 38, 39 and 40, which are spring urged in a counterclockwise direction. Such arms or levers are pivoted as indicated and each is provided with a switch area as shown schematically in FIG. 7. The switches associated with the respective arms, 38, 39 and 40, are indicated generally at 41, 42 and 43 respectively. They are provided with switch arms, 45, 46 and 47, which coact with stationary contacts 48, 49 and 50, respectively. Movable switch blades 45, 46 and 47 are rigid with the lever arms 38, 39 and 40, respectively. No attempt has been made to show insulation, but it is intended that the switch arms 45, 46 and 47 are insulated from other portions of the apparatus. The switch 43 is arranged to place a resistor 51 in parallel with the resistor 17' or 17'', as shown respectively in FIGS. 1, 3 and 4, which have previously been described.

In other words, the resistor 51 is in parallel with the resistor 17′ when the switch 43 is closed. It is obvious that this lowers the effective value of the resistor bridged across the input circuit of the bridge rectifier R.

The switch 42 controls the connection of a relatively large condenser 52 in parallel with the relatively large storage condenser 21 and thus increases the effective capacity of the storage condenser.

The switch 41 controls the connection of the relatively small condenser 53 in parallel with the relatively small condenser 25 and thus increases the effective capacity of the condensers as illustrated in FIGS. 1 and 7.

The same numerals are used in FIG. 7 as those in FIG. 1 wherever possible.

Any one of the several units such as the resistor 51, the condenser 52, or the condenser 53, can be used singly or in pairs, or all used together.

It is obvious that the switches 41, 42 and 43 will be closed after one or more predetermined operations of the circuit interrupter has taken place, provided these operations take place in a relatively closely associated manner as described in detail in the copending application hereinabove noted. It is intended that the counting device or cumulative device will settle back to its initial position provided the total number of operations for which the device is set has occurred. It will also be self-restoring for a different number of operations than the total number of operations for which the device is initially set, as described in detail in the copending application identified hereinabove.

It is apparent that when the large condenser 52 is connected in parallel with the storage condenser 21 that the storage capacity is increased. This increase in capacity increases the time delay for both large and small overload currents.

It is apparent also that if the effect of the small condenser 25 is increased by the addition of the relatively small condenser 53 in parallel that this decreases the time delay at high overload current values.

It is also apparent that if the effective value of the resistor 17′ is decreased by connecting the resistor 51 in parallel, the time delay for small currents is increased.

It is therefore obvious that any one or more of the several different functions of the electronic time delay device of the circuit interrupter can be varied or changed as desired after one or more operations of the circuit interrupter under normal setting or normal conditions. It is also obvious that the normal setting or condition of the electronic time device is restored unless the total predetermined number of operations of the circuit interrupter has occurred, or after a small delay following a lesser number of operations, occurring in quick succession as set forth in the above identified application.

Further, it will be seen that this time delay device is so made that it can be adjusted or set for any desired time-current characteristic with any desired slant thereof as described hereinabove.

Further, it is to be noted that the preferred form of the time delay device shows an arrangement of electronic time delay device in which the characteristic curve is so determined that the time delay is not only inversely proportional to the overload in the power line, but is so arranged that this inverse relation can be increased as the overload increases.

FIG. 8 shows an alternate embodiment of one aspect of the invention in which the illustrated control circuit is the one disclosed in co-pending application Ser. No. 800,-567. In general terms, the device illustrated in FIG. 8 includes main switch means 55 in circuit with the system 56 being protected, switch opening means 57, switch reclosing means 58 and operation counting and lockout means 59. The control circuit for the switch opening means 57 includes a timing portion 60, a minimum actuation current sensing portion 62 and condition sensing and actuation portion 64. The control circuit is coupled to the system 56 by means of a current transformer 72, a bridge type rectifier 74, and a current transformer shunting switch 76. When coupling switch 76 is opened the input of the timing portion 60 receives a rectified current proportional to the alternating current flowing in system 56. The closing of coupling switch 76 short circuits the secondary of current transformer 72 and, in effect, uncouples the time delay device from the system 56.

In general terms, the timing portion 60 comprises means operable upon the occurrence of a predetermined circuit condition to begin timing the condition as a function of its magnitude. This is accomplished by integrating the condition so that the timing cycle comprises the period required for this integral to reach a predetermined value.

More specifically, timing portion 60 includes a first energy storage means coupled to rectifier 74 and adapted, under certain conditions of operation, to be charged by the rectified secondary current from transformer 72. The time required for this energy storage means to achieve a predetermined energy level for any given current in system 56 determines the time current characteristic of the device. This characteristic may be modified by utilizing impedances in circuit with the first energy storage means. A second energy storage means may also be coupled to the rectifier 74 so that energy may be stored therein to provide operating power for the other portions of the device.

The minimum actuation current sensing portion 72 includes means for sensing the occurrence of the predetermined circuit condition and thereupon initiating the integrating cycle of the timing portion 60. This portion is connected to the rectifier 74 and to the timing portion 60 and is operative to prevent the storage of energy on the first energy storage means until the magnitude of the current in the secondary of current transformer 72 indicates the occurrence of said predetermined circuit conditions. Upon this event the first energy storage means is allowed to charge up. The condition sensing and actuation portion 74 comprises means for determining when the condition integral reaches a predetermined value and includes condition sensitive means coupled to said first energy storage means and operable when the energy stored therein reaches a predetermined level.

In the embodiment of the invention shown in FIG. 8, the first and second energy storage means of the timing portion 60 comprise a timing capacitor 79 and a power supply capacitor 80 and each is associated with current dividing charging circuits so that they may be coupled to the secondary of current transformer 72. These charging circuits include a first charging resistor 82 in series with positive input terminal 84 and a second charging resistor 86 and the emitter-base circuit of a charging transistor 90 which are connected in series with each other and in parallel with the first charging resistor 82 so that a current split will result therebetween. The positive power supply terminal A of power supply capacitor 80 is connected to the junction of the first charging resistor 82 and the base of charging transistor 90 and the negative power supply terminal B thereof is connected to the negative input terminal 92 so that the current flowing in resistor 82 will charge the power supply capacitor 80. One end of the timing capacitor 79 is connected to the collector of charging transistor 90 and the other end thereof is connected to the negative input terminal 92 so that it will be charged by the current flowing in charging resistor 86, since the emitter and collector currents of charging transistor 90 are substantially equal. It will be appreciated, by making charging resistor 86 relatively larger than charging resistor 82, a larger portion of the input current will flow to the power supply capacitor 80 than will flow in the charging circuit of timing capacitor 79, thereby allowing the latter to be smaller, and hence more sensitive, than would be the case if there were a substantially equal current split.

In order to limit the charge stored on power supply capacitor 80, a bypass circuit consisting of transistor 94 and Zener diode 95 is provided. The emitter of transistor 94 is connected to the positive power supply terminal A, the collector thereof is directly connected to the negative power supply terminal B, and its base is connected to the latter through Zener diode 95. In operation, when coupling switch 76 is opened, charge will be stored on capacitor 80 until its voltage, which is also the emitter-base voltage of transistor 94, exceeds the breakdown potential of Zener diode 95, whereupon the excess charge on capacitor 80 will begin to flow through the emitter-base circuit of transistor 94 and Zener diode 95. In this manner, current not necessary to maintain power supply capacitor 80 at its desired voltage, is bypassed through transistor 94 and Zener diode 95.

The charging circuit of timing capacitor 79 includes a first variable timing resistor 97 in series with said timing capacitor and connected between its positive terminal C and the collector of transistor 90, and a second variable resistor 98 in a parallel circuit with respect to said timing capacitor. In order to prevent the discharge of timing capacitor 79 through parallel connected timing resistor 98 a rectifier 100 is connected between resistor 97 and the collector of transistor 90.

Series connected timing resistor 47 and parallel connected timing resistor 48 perform the function of modifying the slope of the time-current characteristic of the device. As will be more fully explained below, the time-delay device illustrated in FIG. 8 will be made operative when the voltage at junction point D, between the collector of transistor 90, rectifier 100 and timing resistor 98, reaches a predetermined value. It can be seen that this voltage comprises the sum of the voltage drop across timing resistor 97 and the voltage across timing capacitor 79.

In order to illustrate how the timing resistors 97 and 98 operate to modify the time-current characteristics of the device, reference is made to FIGS. 9, 10, 11 and 12 in which curve 102 represents the time-current characteristic which the device illustrated in FIG. 8 would have if resistors 97 and 98 were eliminated, that is, if resistor 97 were short circuited or had a value of zero resistance so that there would be no voltage drop across it, and if resistor 98 were open circuited or had a value of infinite resistance so that it could not shunt current around timing capacitor 79. In other words, curve 102 represents the time required for the current flowing in resistor 96 to charge timing capacitor 79 to the predetermined energy level required for operation. It will be appeciated that timing capacitor 79 has an inverse time-current characteristic, that is, it charges up in a relatively short time at high current values while at low current values a relatively longer charging time is required.

Figure 9:
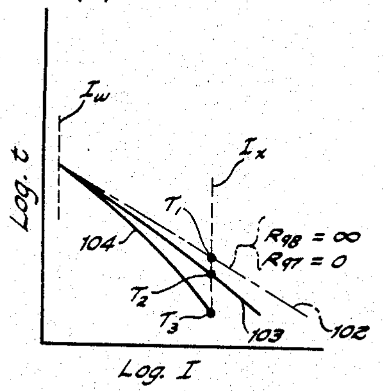

The addition of timing resistor 97 will have little effect on the time-current characteristic of the device at very low values of current such as I in FIG. 9, because the voltage drop across this resistor, resulting from such low current values, will be negligible compared to the total voltage required for operation. As a result, the voltage across timing capacitor 79, resulting from the accumulation of charge thereon, will comprise substantially all the voltage required for operation. At higher values of current, however, such as $I_x$ in FIG. 9, the voltage drop across timing resistor 97 will be substantially increased, and, accordingly, represent a significant portion of the total operating voltage. As a result, junction point D in FIG. 2 will reach the required operating voltage in a shorter time than that required to charge timing capacitor 79 to this voltage value. The use of timing resistor 97 will have the effect, therefore, of shortening the operating time of the time current device for a current $I_x$ from a time $T_1$ on curve 102 which is the charging time of timing capacitor 79, to a shorter time $T_2$ on curve 103. Similarly, an increase in the resistance of timing resistor 97 will increase the voltage drop across it, thereby further shortening the operating time for current $I_x$ from time $T_2$ on curve 103 to time $T_3$ on curve 104. It can therefore be seen that by varying timing resistor 97 from zero through a range of finite values, a family of time current characteristics can be obtained similar to curves 102, 103 and 104 shown in FIG. 9.

Figure 10:
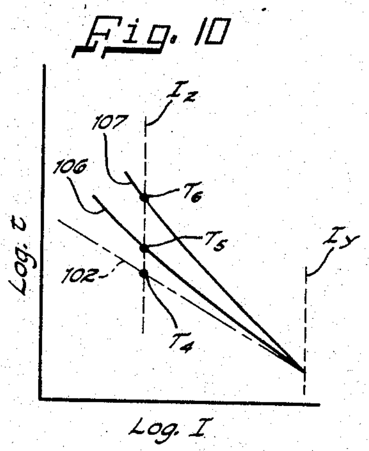
Figure 11:
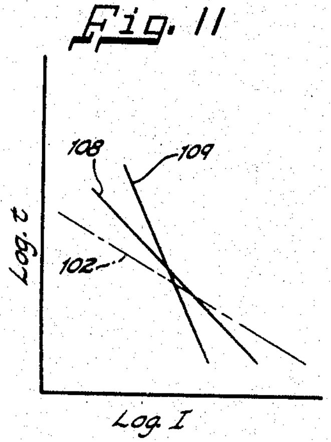

Referring now to FIGS. 8 and 10, it can be seen that if the resistance of timing resistor 98 were changed from infinity to some finite value, current would be shunted through it and around timing capacitor 79. As a result, some of the current that would otherwise charge timing capacitor 79 will be drained off, thereby lengthening the time required for capacitor 79 to charge up to a predetermined voltage value. This effect will be negligible at a very high current value, such as $I_y$ in FIG. 10, because the current drained off by timing resistor 98 will be negligible compared to the total current flowing in the collector of transistor 90 so that the current available to charge timing capacitor 79 will be substantially all of this collector current. At relatively lower values of fault current, however, such as $I_x$ in FIG. 10, the current drained off through timing resistor 98 becomes a substantial portion of the current flowing in the collector of transistor 90 so that the time required for timing capacitor 79 to charge up will be significantly increased. As a result, by changing the resistance of timing resistor 98 from infinity to some finite value, the charging time of timing capacitor 79 will increase from time $T_4$ on curve 102 to a longer time $T_5$ on curve 106. Similarly, a further decrease in the resistance of timing resistor 98 will increase the amount of shunted current, thereby further lengthening the time required for the charging of timing capacitor 79 by a current $I_x$ from time $T_5$ on curve 106 to a longer time $T_6$ on curve 107.

It can therefore be seen from FIGS. 9 and 10, that the slope of the time-current characteristic of the device at high fault current values can be substantially modified by varying timing resistor 97 while at low fault current values the slope thereof can be substantially modified by varying timing resistor 98. As a result, by a suitable variation of both timing resistors 97 and 98 a family of time-current characteristics, such as those represented by curves 102, 108 and 109 shown in FIG. 11, may be obtained.

The time-current characteristic of the device can be further varied by changing the capacitance of timing capacitor 79 whereupon the time required for it to charge up will change accordingly. Such variations will have the effect of moving the time-current characteristics of the device vertically, giving a family of time-current characteristics such as curves 102, 111 and 112 in FIG. 11. Hence, by suitably varying timing capacitor 79 and timing resistors 97 and 98 the time-current characteristic of the device can be widely varied both as to slope and height. As a result of this flexibility, the time-current device according to the invention may be easily and accurately coordinated with a wide variety of secondary protective devices without modification or redesign.

In order to insure that the device will operate only upon the occurrence of a predetermined fault in the system 56, the minimum actuation current sensing portion 12 is provided with means for sensing the occurrence of said fault and to then initiate the timing portion 10. More specifically, this portion is provided with means for shunting the timing capacitor 29 during no fault conditions and means responsive to a predetermined current in said system to prevent the discharge of said timing capacitor through said shunting means upon the occurrence of a fault.

Referring again to FIG. 8, timing capacitor 79 is normally shunted by leakage resistor 113 through the path defined by conductor 115, rectifier 116, conductor 118 and negative supply conductor 119. As a result of this leakage through resistor 113, timing capacitor 79 is held to a negligible voltage with respect to that value necessary for operation of the device. In this manner the time-current relay is prevented from operating at currents below the desired minimum fault or actuation current value.

The minimum actuation current of the device is sensed by comparing an electrical signal which is proportional to the current in system 56 with the actuation value of a signal responsive device. When this actuation value is exceeded, the minimum actuation current sensing portion is made operative to prevent the further discharge of timing capacitor 79 through leakage resistor 113. As a result, timing capacitor 79 commences charging up, and the timing cycle begins.

The signal responsive device of the minimum actuation current sensing portion 62 comprises a transistor 120 whose base is connected to the input terminal 84 through a coupling circuit so that said base receives a voltage proportional to the current flowing in the secondary of current transformer 72. The emitter of transistor 120 is held at a fixed potential by a Zener diode 122 and a resistor 123. When the minimum actuation current of the device is equalled or exceeded the base potential of transistor 120 will exceed its emitter potential so that it will conduct, whereupon the minimum actuation current sensing portion 62 becomes operative to prevent the further discharge of capacitor 79 through leakage resistor 113.

The coupling circuit to the base of transistor 120 includes a first coupling transistor 125 and a second coupling transistor 126. The base of the first coupling capacitor 125 is connected to the positive power supply terminal A through positive supply conductor 127, while the emitter thereof is connected to input terminal 84 by conductor 128 and resistor 129. It can be seen that resistor 82 on the one hand and resistor 129 and the emitter-base circuit of transistor 125 on the other are connected in parallel, and, accordingly, the emitter of transistor 125 will be at a higher potential than its base. As a result, collector current will flow from transistor 125 to the voltage divider consisting of resistor 130 and adjustable resistor 132, which are serially connected between said collector and the negative power supply conductor 119. This current will be proportional to the current in system 56 and, accordingly, the potential of junction point E between resistors 130 and 132 will be proportional to this current. The base of the second coupling transistor 126 is connected to junction point E, while its emitter is connected to the negative supply conductor 119 through resistor 134 and its collector is connected to the positive power supply conductor 127 through resistor 136. The voltage on the base of coupling transistor 126, which is proportional to the current in system 56, determines the magnitude of its emitter and collector currents. It can be seen, therefore, that the potential of junction point F, between the emitter of transistor 126 and resistor 134, will aso be proportional to the system current since it is determined by the voltage drop across resistor 132 and, hence, is proportional to the emitter current of transistor 126.

The base of signal responsive transistor 120 is connected to junction point F and its emitter is connected to junction point G between Zener diode 122 and resistor 123. The other terminals of Zener diode 122 and resistor 123 are connected to the negative supply conductor 119 and the positive supply conductor 127, respectively. When the system is initially energized, resistor 123 will hold junction point G at the potential of positive power supply terminal A until this potential exceeds the breakdown potential of Zener diode 122 whereupon it will begin conducting and junction point G will thereafter be held at this potential.

Because signal responsive transistor 120 is of the NPN type, it will conduct when its base potential exceeds its emitter potential, and hence when the potential of junction point F exceeds the potential of junction point G. It will be recalled that the potential of junction point F is proportional to the potential of junction point E and that the voltage of the latter is the function of the voltage drop across variable resistor 132. Hence, by adjustment of variable resistor 132, the voltage of junction point F can be made to exceed the breakdown potential of Zener diode 122 and, as a result, the potential of junction point G, at any desired value of current in system 56. By properly setting resistor 132, therefore, transistor 120 can be made operative at any predetermined value of system current which is then the minimum actuation current of the time delay device. Any current equal to or above this minimum actuation current is considered a fault current and will cause the device to operate.

The collector of signal responsive transistor 120 is connected to the negative power supply conductor 119 through capacitor 138 and to the positive power supply conductor 127 through serially connected resistors 140 and 142. The base of an output transistor 144 is connected to junction point H between resistors 140 and 142 while its emitter is connected to positive power supply conductor 127 and its collector is connected to junction point J between conductor 118 and leakage resistor 113. Before signal responsive transistor 120 begins conducting, resistor 142 will hold junction point H at the same potential as the emitter of output transistor 124 so that said transistor will not conduct. When signal responsive transistor 120 begins conducting as a result of a fault, however, collector current will flow from the positive power supply conductor 127 through resistors 142 and 140. The resulting voltage drop across resistor 142 lowers the potential of junction point H, and hence the base of output transistor 144 relative to its emitter potential, whereupon said transistor will begin conducting collector current to junction point J. The collector current from output transistor 144 flows through leakage resistor 113, raising the potential of junction point J to some positive value. Capacitor 138 performs the function of holding junction point K at a substantially constant value after transistor 120 begins conducting so that transistor 120 will continue to conduct even though the power supply is a pulsating D.C. which periodically goes through zero.

It will be recalled that timing capacitor 79 has been discharging through resistor 113 during the period of no-fault operation, so that the potential at its positive terminal C will be less than the potential that junction point J assumes as a result of the current flowing through the collector of coupling transistor 144 upon the occurrence of a fault. This difference in potential between points C and J, prevents the further discharge of timing capacitor 79 through resistor 113, while rectifier 116 prevents reverse current flow from junction point J to terminal point C. Since timing capacitor 79 can no longer discharge through resistor 113 it begins charging and continues until its voltage, plus the voltage drop across resistor 97 is sufficient to cause operation of the energy sensing and actuation portion 64 of the device in the manner described in the ensuing paragraphs.

The condition sensing and actuation portion 64 is operative to compare a voltage proportional to the voltage at junction point D with a fixed reference voltage. When this proportional voltage exceeds the reference voltage a voltage comparison transistor 148 begins conducting, whereupon the actuation portion becomes operative.

The voltage comparison transistor 148 is coupled to junction point D by coupling transistors 150 and 151, which are cascaded as emitter followers to reduce to a very small value the current drawn from the timing portion 60. Each of the coupling transistors 150 and 151 is of the NPN type and the collector of each is connected to the positive power supply terminal A, while the base of transistor 150 is connected to junction point D and its emitter is connected to the negative power supply terminal B through resistor 158. In a like manner, the base of transistor 151 is connected to the emitter of transistor 150 and the collector thereof is connected to the negative power supply terminal B through a voltage divider consisting of variable resistors 155 and 156 which are joined at junction point M. Because the base of coupling transistor 150 is connected to junction point D and because the emitter thereof is connected to the negative power supply terminal B through resistor 153 its base potential will exceed its emitter potential and emitter current will flow through resistor 153. The emitter current from coupling transistor 150 flowing through resistor 153 will, in turn, raise the potential of junction point L between resistor 153 and the emitter and base of transistors 150 and 151 respectively, to some positive potential which is proportional to the potential at junction point D and which is higher than the emitter potential of transistor 151. This results in a transistor 151 emitter current flowing through resistors 155 and 156, and this current is also proportional to the voltage at junction point D. The resulting voltage drops in resistors 155 and 156 place a potential on junction point M which is proportional to the potential at junction point D.

The base of voltage comparing transistor 148 is connected to junction point M so that its base voltage is proportional to the voltage at junction point D. The emitter of voltage comparing transistor 148 is connected to the junction point P between Zener diode 160 and resistor 161 whose other terminals are connected to the negative power supply terminal B and to the positive power supply terminal A respectively. When coupling switch 76 is initially opened, resistor 161 will hold junction point P at the potential of the positive power supply terminal A until this potential exceeds the breakdown potential of Zener diode 160. The potential of point P is, thereafter, held at the breakdown potential of Zener diode 160 and, as a result, the emitter of voltage comparing transistor 148 will be held at this, a fixed potential.

Because voltage comparing transistor 148 is of the NPN type, it will conduct only when its base potential exceeds its emitter potential. Hence, when the potential at junction point M is less than the breakdown potential of Zener doide 160, the voltage comparing transistor 148 will be non-conducting. Resistor 155 is made adjustable so that when junction point D reaches the potential at which it is desired to operate the condition sensing portion 64, the voltage at point M can be made just sufficient to cause voltage comparing transistor 148 to begin conducting.

A relay winding 170 is connected between the collector of voltage comparing transistor 148 and the positive power supply terminal A so that when said transistor begins conducting as the result of a fault in the manner discussed above, current will be drawn through relay winding 170.

Capacitor 172 holds the collector of transistor 148 at a substantially constant potential even though the power supply is a pulsating D.C. This allows transistor 148 to conduct steadily after its operation is initiated so that relay 120 will not chatter.

It is understood that the energization of relay winding 170 can be utilized to actuate any apparatus with which the time delay device according to the invention is to be utilized. In the illustrated example, it is made to close normally open contacts 174, thereby placing the trip coil 176 of the circuit breaker across a suitable source of electrical energy, such as battery 178. Upon this event, trip plunger 190 is moved to the right in FIG. 8, rotating bell crank latch 191 in a counterclockwise direction about its pivot point 192 and against the force of its biasing spring 193, thereby releasing the main contacts operating bar 180 so that it may move downwardly toward open position under the influence of opening spring 194.

When the main contacts operating bar 180 reaches its fully open position, normally open contacts 188 will be closed by operating arm 196 carried on said operating bar so that the circuit through solenoid coil 179 of reclosing means 58 will be completed through conductors 181, 182 and 183 and normally closed contacts 186. This actuates reclosing solenoid 179 to move operating bar 180 upwardly, thereby closing main contacts 55. In order to allow fuses in the branch lines to cool properly, instantaneous reclosing of main contacts 55 may be prevented by dashpot means 199 connected to operating bar 180.

After the fault in system 56 has been interrupted, and before the reclosing of the main contacts 55, the potential at junction point F will fall below that of junction point G and transistor 120 and, hence, transistor 144 will cease conducting. This allows the potential at junction point J to fall below that of terminal C so that timing capacitor 79 can again discharge through leakage resistor 113. This, in turn, lowers the voltage at junction point D and, consequently, at junction point M so that transistor 144 will cease conducting and relay 170 is de-energized. The time necessary for timing capacitor 29 to substantially discharge through resistor 113 is the resetting time of the device, and this time is generally measured in terms of fractions of a second. If the fault disappears while timing capacitor 79 is charging but prior to the attainment of the predetermined operating voltage at junction point D, and hence prior to the energization of relay 170, timing capacitor 79 will similarly begin discharging through leakage resistor 113 and the device will reset.

The de-energization of relay 170 opens contacts 174 to release plunger 190 so that the latch 191 is free to rotate in a clockwise direction under the influence of biasing spring 193 to its latched position shown in FIG. 8. As a result, when operating bar 180 reaches its fully closed position as shown in FIG. 8, it will be latched in this position by bell crank latch 191. If the fault disappears from the system 20 while contacts 55 were in their open position, they will remain latched upon reclosing. However, should the fault persist, main contacts 55 will again be tripped open and reclosed in the manner previously described. This cycling will continue until the fault clears or until lockout means 59 is actuated to lock the main contacts open in the manner to be discussed hereinbelow.

The operation counting means schematically illustrated in FIG. 8 is of the hydraulic type and utilizes as a hydraulic medium the dielectric fluid in which such repeating circuit interrupters are normally disposed. This operation counting means includes a pump piston 198 disposed in a pump cylinder 200 and a counting piston 202 disposed in counting cylinder 203. The pump piston 198 is driven by movement of operating bar 180 to which it is connected by means of a link 204 and a bell crank 206 which is pivoted at 207 and which is connected at one end to link 204 and at its other to operating arm 208 mounted on the operating bar 180. Each time the main contacts 55 are opened, bell crank 206 is rotated about pivot 207 in a clockwise direction so that pump piston 198 is moved upwardly drawing hydraulic fluid into pump cylinder 200. When contacts 55 are reclosed, bell crank 206 is rotated in a counterclockwise direction to force a fixed quantity of hydraulic fluid from pump cylinder 200 through passage 210, and past bell check 212 to the pressure side of counting piston 202. As the circuit interrupter operates repeatedly, the piston 202 is forced hydraulically upward in a step-by-step manner, causing a corresponding movement of counting bar 214 to the left, as viewed in FIG. 8, through the agency of link 216 and bell crank 218. Upward movement of counting piston 202 rotates bell crank 218 in a counterclockwise direction about pivot 219, to force counting bar 214 to the left against the influence of resetting spring 220. After lockout, or after the fault has cleared prior to lockout, the leakage of hydraulic fluid past counting piston 202 allows resetting spring 220 to return counting bar 214 and timing piston 202 to their initial positions shown in FIG. 8.

Movement of counting bar 214 a predetermined distance to the left after a predetermined number of opening operations operates to modify the values of the primary timing capacitor 79 and the primary timing resistors 97 and 98 by placing in circuit with these timing impedances, a second set of auxiliary timing impedances comprising capacitor 229 and resistors 247 and 248. This alters the time delay characteristics of the time delay device in the manner discussed with respect to FIGS. 9–12, so that after a predetermined number of opening operations, the circuit interrupter is automatically switched from one time-current characteristic to another. Modification of the values of the primary timing impedance is accomplished by switch means 222 which is actuable by counting bar 214 after a predetermined number of operations to couple or uncouple the auxiliary timing impedances to or from the primary timing impedances.

Movement of counting bar 214 is transmitted to switch means 222 by positioning pins 223, 223' and 223'' which act as stop means to prevent the counterclockwise rotation of switch carriers 224, 224' and 224'' around their respective pivots 225, 225' and 225'' under the influence of their associated biasing springs 226, 226' and 226''. Each of the contact members 224, 24' and 224'' carries a conductive brush member 227, 227' and 227'' respectively which may be manually set in one of two angular positions against stops 228–230, 228'–230' and 228''–230''. For the sake of illustration, brush contacts 227 and 227' are shown in a first angular position relative to fixed contacts 232 and 232' and against stop members 228 and 228' respectively while brush contact 227'' is shown in a second angular position against stop member 230'', so that it will engage fixed contact 232''.

Assume, for the sake of illustration, that the repeating circuit interrupter schematically illustrated in FIG. 8 is designed to execute two rapid opening operations and two time delayed operations prior to lockout. Upon the first reclosing operation, counting bar 214 will be moved a first predetermined distance to the left as viewed in FIG. 8 allowing contact members 224, 224' and 224'' to rotate through a small counterclockwise angle. This moves conductive brush members 227 and 227' a short distance toward the left-hand edge of stationary contacts 232 and 232' respectively and also moves conductive brush 227'' to the right-hand edge of stationary contact 232''. Upon the movement of counting bar 214, a second predetermined distance to the left when the main contacts 130 are reclosed for a second time, the brush members 227 and 227' will be moved onto their associated stationary contacts 232 and 232'' while brush member 227'' will be moved off of its associated stationary contact 232''. This completes the circuit through conductors 250 and 251 to place auxiliary timing capacitor 229 in parallel with primary capacitor 79 and also completes the circuit through conductors 253 and 254 to place auxiliary timing resistor 248 in parallel with primary timing resistor 98. On the other hand, movement of conductive brush 227'' off of stationary contact 232'' interrupts the circuit through conductors 256 and 257 to take auxiliary timing resistor 247 out of parallelism with primary timing resistor 97.

Figure 12:
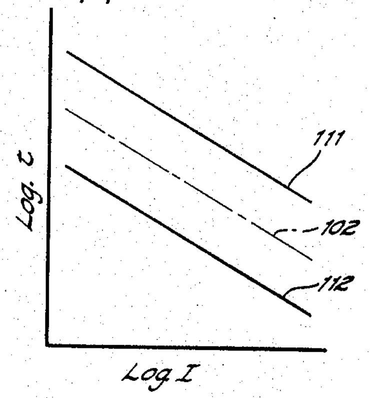

It will be appreciated by those skilled in the art that the placing of auxiliary timing capacitor 229 in parallel with primary timing capacitor 79 increases the total timing capacitance, thereby moving the time delay characteristic of the device vertically as shown in FIG. 12 from curve 112 to curve 111. The magnitude of this shift will, of course, depend on the relative sizes of primary timing capacitor 79 and auxiliary timing capacitor 229. For example, if primary timing capacitor 79 has a value of zero capacitance and auxiliary timing capacitor 229 has some finite value of capacitance, the initial opening operations will be substantially instantaneous while subsequent opening operations will be time delayed in accordance with the value of auxiliary timing capacitor 229.

In a similar manner, the placing of auxiliary timing resistor 248 in parallel with primary timing resistor 98 will have the effect of decreasing the total resistance shunting the timing capacitor and thereby increasing the slope of the time-current characteristic at its high current end as discussed with respect to FIG. 9. On the other hand, the open circuiting of auxiliary timing resistor 247 removes it from parallelism with timing resistor 97, thereby increasing the resistance in series with the timing capacitor so that the slope at the low current end of the time current characteristic is increased in the manner discussed with respect to FIG. 10.

Figure 13:
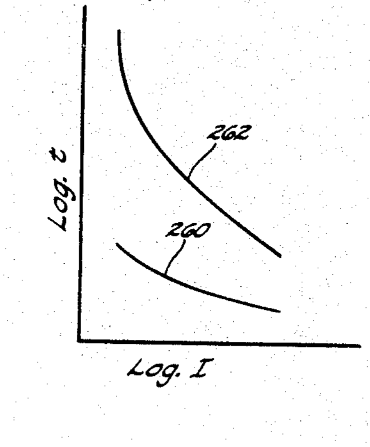

It can be seen, therefore, that by increasing the capacitance of the timing capacitor and the resistance of the series timing resistor and by decreasing the resistance of the paralllel timing resistor after a predetermined number of opening operations, the time-current characteristic for subsequent operations may be given a steeper slope as well as moved vertically. This is illustrated in FIG. 13 wherein 260 represents the time-current characteristic of the device during the initial or rapid opening operations and 262 represents its time-current characteristic during time delayed operations. It will be understood that the slope of the time delayed curve 262 may be decreased relative to the rapid curve 260 by reversing the positions of conductive brushes 227 and 227'' from that shown in FIG. 8 so that conductive brush 227 initially engages stationary contact 232 and conductive brush 227 is initially out of engagement with its associated stationary contact 232''. Those skilled in the art will further appreciate that the degree of slope for the rapid and time delayed curves can be altered by suitable adjustment of primary and auxiliary timing resistors 97, 98, 247 and 248.

After a predetermined number of opening operations, usually four, the fault is considered permanent and it is then desirable to prevent the main contacts 55 from subsequently reclosing. This is accomplished in the embodiment illustrated in FIG. 8 by operating lockout means 59 to open normally closed contacts 186 so that the closing of normally open contacts 188 will not result in the energization of reclosing solenoid coil 179. This is accomplished by providing an operating arm 260 on counting bar 214 which is so located relative to lockout means 59 that after three reclosing operations it is moved sufficiently to the left in FIG. 10 to engage the upper end of latch lever 262 and rotate it in a counterclockwise direction against the force of biasing spring 263. As latch lever 262 rotates its lower end 264 moves past the upper end 265 of switch operating lever 266 so that the latter is then free to rotate in a counterclockwise direction under the influence of its associated biasing spring 268 until it engages stop 270. This snaps normally closed contacts 186 open and thereby prevents the re-energization of reclosing solenoid 179 upon the subsequent opening of main contacts 58. After the main contacts 130 have been locked open in this manner, counting piston 202 will resettle in counting cylinder 203 under the influence of biasing spring 220. Contacts 186 may be reclosed by rotating operating lever 266 in a clockwise direction in any suitable manner such as by coupling it to a manual operating handle (not shown). Such rotation moves the upper end 265 of operating lever 266 past the lower end 264 of latch lever 262 so that it is again latched in the position shown in FIG. 8.

While only a few embodiments of the invention have been illustrated and described herein, it is understood that a number of other modifications will be apparent to those skilled in the art without departing from the true spirit of the invention, and, accordingly, it is intended in the appended claims to cover all such modifications.

I claim:

1. In combination: means adapted to be coupled to an electric current circuit for deriving therefrom a D.C. signal having a magnitude dependent upon the value of a characteristic electric quantity of the circuit; circuit means including two interconnected sections comprising, respectively, a resistance element and a reactance element comprising energy storage means disposed for energization under the control of said D.C. signal, wherein one of the sections comprising in parallel combination at least two elements of like kind, said energy storing means also including nonlinear impedance means connected in series circuit relationship therewith, the effective impedance of said nonlinear means being higher, whenever voltage across the resistance element is less than a predetermined magnitude, than when said voltage is greater than said predetermined magnitude; and means connected to said energy storing means for initiating a predetermined control function in response to the accumulation by said energy storing means of at least predetermined amount of energy.

2. Protective means for an electric current circuit, comprising: means adapted to be coupled to the circuit for deriving therefrom a D.C. signal having a magnitude dependent upon the magnitude of a characteristic electric quantity of the circuit; electric energy storing means including a reactance section arranged for energization in accordance with the magnitude of said D.C. signal whenever said magnitude exceeds a predetermined pickup level, a resistance section connected to said reactance section with one of the section comprising a plurality of elements of like kind, said energy storing means also including nonlinear impedance means connected in circuit with said reactance section, the impedance of said nonlinear means being dependent upon the magnitude of voltage across said resistance section; and means connected to the energy storing means for producing an output control signal in response to the accumulation of at least a predetermined amount of energy by said energy storing means.

3. Overcurrent protective means for an electric current circuit, comprising: means adapted to be coupled to the circuit for deriving therefrom a D.C. signal representative of circuit current; two interconnected sections including, respectively, a resistance element comprising energy storing means and a reactance element with one of the sections comprising in parallel combination at least two elements of like kind, said one section having impedance means disposed in series circuit relationship therewith, said impedance means being characterized by changeable impedance conditions, said D.C. signal being supplied to the energy storing means for energizing the same and said impedance means being so arranged that its impedance condition is dependent upon the magnitude of said D.C. signal; and means connected to said energy storing means for initiating a predetermined control function in response to the accumulation of at least a predetermined amount of energy by the energy storing means.

4. An electronic timer for a repeating circuit interrupter in circuit with an electrical system, an input circuit for supplying a D.C. signal functionally related to the current in said system, energy storage means comprising a reactance element, a resistance element in circuit with said reactance element, first means coupled to said input circuit for initiating the charging of said energy storage means when said D.C. signal reaches the predetermined magnitude, an output means coupled to said energy storage means and responsive to the charge therein to effect the interruption of said system current along an inverse time-current characteristic, said energy storage means also including non-linear impedance means for altering said time-current characteristic, the impedance of said non-linear impedance means being dependent on the magnitude of said D.C. signal.

5. The electronic timer set forth in claim 4 wherein said energy storage means includes a capacitance which forms a RC time-delay circuit with said resistance.

6. The electronic timer set forth in claim 4 wherein said first means includes relay means normally short circuiting said energy storage means and having control means in circuit to receive said D.C. signal for opening said relay means when the magnitude of said signal reaches a predetermined value.

7. Electronic timer set forth in claim 4 wherein said output means includes trip means having electromotive means and control means in circuit with said energy storage means, said non-linear impedance means comprising a resistance element and reactance element connected in parallel circuit relation and the combination connected between said energy storage means and said control means.

8. Electronic timer set forth in claim 4 wherein the impedance of said non-linear means is greater for lower values of said D.C. signal than it is for higher values thereof so as to modify the high current portion of said time current characteristic.

9. The electronic timer set forth in claim 8 wherein said energy storage means includes a capacitance which forms an RC time-delay circuit with said resistance and wherein said non-linear impedance means is connected in a series circuit relationship with said capacitance.

10. Electronic timer set forth in claim 9 wherein said first means include relay means normally short-circuiting said energy storage means and control means in circuit to receive said D.C. signal for opening said relay means when the magnitude of said signal reaches a predetermined value.

11. An electronic timer for a repeating circuit interrupter having trip means for tripping said interrupter, said timer having an input circuit including means for supplying current proportional to overloads, an intermediate circuit, a rectifier between said input and intermediate circuits, said intermediate circuit, including a relatively large storage capacitor connected in a shunt circuit relation, input relay means biased closed and normally short-circuiting said storage capacitor and having control means in series with the input circuit for opening said input relay means, a first resistor effectively bridging the input of said rectifier, a final output circuit connected to the trip means of said interrupter, said output circuit including output relay means selectively connecting and disconnecting said trip means and said intermediate circuit and having control means, a relatively small capacitor and a second resistor in parallel and connected in series with the control means of said output relay means.

12. An electronic timer for a repeating circuit interrupter having trip means for tripping said interrupter, said timer having an input circuit for supplying current proportional to overloads, an intermediate circuit, a rectifier between said input and intermediate circuits, said intermediate circuit including a first relatively large storage capacitor connected in a shunt circuit relation, input relay means biased closed and normally short-circuiting said storage capacitor and having control means in series with the input circuit for opening said input relay means, a first resistor effectively bridging the input of said rectifier, a final output circuit connected to the trip means of said interrupter, said output circuit, including output relay means selectively connecting and disconnecting said trip means and said intermediate circuit and having control means, a relatively small capacitor and a second resistor in parallel and connected in series with the control means of said output relay means.

13. An electronic timer for a repeating circuit interrupter having trip means for tripping said interrupter, said timer having an input circuit for supplying current proportional to overloads, an intermediate circuit, a rectifier between said input and intermediate circuits, said intermediate circuit including a relatively large storage capacitor connected in a shunt circuit relation, input relay means biased closed and normally short-circuiting said storage capacitor and having control means in series with the input circuit for opening said input relay means, a first resistor effectively bridging the input of said rectifier, a final output circuit including output relay means selectively connecting and disconnecting said trip means and said intermediate circuit and having control means, a relatively small capacitor and a second resistor in parallel and connected in series with the control means of said output relay means.

(References on following page)

References Cited

UNITED STATES PATENTS

| | | | |
|---|---|---|---|
| 3,167,686 | 1/1965 | Riebs | 317—33 X |
| 1,939,609 | 12/1933 | Minkler | 317—36 |
| 2,210,669 | 8/1940 | Johnson | 317—36 |
| 1,714,071 | 5/1929 | Biles | 317—36 |
| 2,389,564 | 11/1945 | Sunstein | 317—141 |
| 2,259,331 | 10/1941 | Vedder | 317—52 |
| 2,920,242 | 5/1960 | Koss | 317—36 |
| 2,279,849 | 4/1942 | Warrington | 317—141 |
| 2,875,382 | 2/1959 | Sandin et al. | 317—36 |
| 2,906,941 | 9/1959 | Brolin | 317—36 |
| 2,977,510 | 3/1961 | Adamson et al. | 317—36 |
| 1,877,446 | 9/1932 | Curtis | 317—36 |
| 1,960,068 | 5/1934 | Ruppell | 317—31 |
| 2,671,874 | 3/1954 | Friedricks | 317—52 |

MILTON O. HIRSHFIELD, *Primary Examiner.*

J. D. TRAMMELL, *Assistant Examiner.*